United States Patent
Coon et al.

(10) Patent No.: US 7,877,585 B1
(45) Date of Patent: Jan. 25, 2011

(54) STRUCTURED PROGRAMMING CONTROL FLOW IN A SIMD ARCHITECTURE

(75) Inventors: Brett W. Coon, San Jose, CA (US); John R. Nickolls, Los Altos, CA (US); John Erik Lindholm, Saratoga, CA (US); Svetoslav D. Tzvetkov, Irvine, CA (US)

(73) Assignee: NVIDIA Corporation, Santa Clara, CA (US)

( * ) Notice: Subject to any disclaimer, the term of this patent is extended or adjusted under 35 U.S.C. 154(b) by 671 days.

(21) Appl. No.: 11/845,429

(22) Filed: Aug. 27, 2007

Related U.S. Application Data

(60) Provisional application No. 60/864,574, filed on Nov. 6, 2006.

(51) Int. Cl.
- G06F 15/76 (2006.01)
- G06F 7/38 (2006.01)
- G06F 9/00 (2006.01)
- G06F 9/44 (2006.01)

(52) U.S. Cl. .................... 712/233; 712/22; 712/234; 712/E9.058; 712/E9.071

(58) Field of Classification Search ............. 712/233, 712/234, 22
See application file for complete search history.

(56) References Cited

U.S. PATENT DOCUMENTS

| | | | |
|---|---|---|---|
| 5,045,995 A | 9/1991 | Levinthal et al. | |
| 5,430,854 A | 7/1995 | Sprague et al. | |
| 5,551,041 A | 8/1996 | Beethe | |
| 5,555,428 A * | 9/1996 | Radigan et al. | 712/22 |
| 5,850,543 A | 12/1998 | Shiell et al. | |
| 5,864,697 A * | 1/1999 | Shiell | 712/240 |
| 6,725,308 B2 | 4/2004 | Joy et al. | |
| 6,889,319 B1 | 5/2005 | Rodgers et al. | |
| 2002/0010733 A1 | 1/2002 | Baba et al. | |
| 2005/0289329 A1 | 12/2005 | Dwyer et al. | |
| 2006/0101256 A1 | 5/2006 | Dwyer et al. | |

OTHER PUBLICATIONS

Saumya et al., Call Forwarding: A Simple Low-Level Code Optimization Technique, 1994.*
Eggers, et al. "Simultaneous Multithreading: A Platform for Next-Generation Processors," *IEEE Micro*, vol. 17, No. 5, pp. 12-19, Sep./Oct. 1997.
Kuszmaul, Bradley C., "Synchronized MIMD Computing," 1994, MIT, pp. 1-162.
Chou, W.H., et al., "Register Transfer Modeling and Simulation for Array Processors," 1994, IEEE, pp. 111-122.

* cited by examiner

*Primary Examiner*—Alford W Kindred
*Assistant Examiner*—Jesse R Moll
(74) *Attorney, Agent, or Firm*—Patterson & Sheridan, LLP

(57) ABSTRACT

One embodiment of a computing system configured to manage divergent threads in a SIMD thread group includes a stack configured to store state information for processing control instructions. A parallel processing unit is configured to perform the steps of determining if one or more threads diverge during execution of a conditional control instruction. A disable mask allows for the use of conditional return and break instructions in a multithreaded SIMD architecture. Additional control instructions are used to set up thread processing target addresses for synchronization, breaks, and returns.

20 Claims, 8 Drawing Sheets

| PC | Active Mask | TOS | TOS-1 |
|---|---|---|---|
| 0 | 0xff | -- | -- |
| 1 | 0xff | SYNC, Mask =0xff, PC=7 | -- |
| 2 | 0xff | DIV, Mask =0xc, PC=3 | SYNC, Mask =0xff, PC=7 |
| 6 | 0xf3 | DIV, Mask =0xc, PC=3 | SYNC, Mask =0xff, PC=7 |
| 7 | 0xf3 | DIV, Mask =0xc, PC=3 | SYNC, Mask =0xff, PC=7 |
| 3 | 0x0c | SYNC, Mask =0xff, PC=7 | -- |
| 4 | 0x0c | SYNC, Mask =0xff, PC=7 | -- |
| 5 | 0x0c | SYNC, Mask =0xff, PC=7 | -- |
| 7 | 0x0c | SYNC, Mask =0xff, PC=7 | -- |
| 7 | 0xff | -- | -- |

Figure 6

| PC | Active Mask | Disable Mask | TOS | TOS-1 | TOS-2 |
|---|---|---|---|---|---|
| 50 | 0xff | 0x0000 | CAL, Mask =0xff, PC=51 | -- | -- |
| 0 | 0xff | 0x0000 | SSY, Mask =0xff, PC=7 | CAL, Mask =0xff, PC=51 | -- |
| 1 | 0xf3 | 0x0000 | DIV, Mask =0x0c, PC=2 | SSY, Mask =0xff, PC=7 | CAL, Mask =0xff, PC=51 |
| 5 | 0xf0 | 0x0005 | DIV, Mask =0x0c, PC=2 | SSY, Mask =0xff, PC=7 | CAL, Mask =0xff, PC=51 |
| 6 | 0x0c | 0x0005 | DIV, Mask =0x0c, PC=2 | SSY, Mask =0xff, PC=7 | CAL, Mask =0xff, PC=51 |
| 7 | 0x0c | 0x0005 | SSY, Mask =0xff, PC=7 | CAL, Mask =0xff, PC=51 | -- |
| 2 | 0x0c | 0x0005 | SSY, Mask =0xff, PC=7 | CAL, Mask =0xff, PC=51 | -- |
| 3 | 0x0c | 0x0005 | SSY, Mask =0xff, PC=7 | CAL, Mask =0xff, PC=51 | -- |
| 4 | 0x0c | 0x0005 | SSY, Mask =0xff, PC=7 | CAL, Mask =0xff, PC=51 | -- |
| 7 | 0xfc | 0x0005 | CAL, Mask =0xff, PC=51 | -- | -- |
| 8 | 0xff | 0x0000 | | -- | -- |
| 51 | 0xff | 0x0000 | -- | -- | -- |

Figure 7

STRUCTURED PROGRAMMING CONTROL FLOW IN A SIMD ARCHITECTURE

CROSS-REFERENCE TO RELATED APPLICATIONS

This application claims benefit of U.S. provisional patent application Ser. No. 60/864,574, filed Nov. 6, 2006, which is herein incorporated by reference.

BACKGROUND OF THE INVENTION

1. Field of the Invention

The present invention generally relates to graphics processing and more specifically to a system and method for managing divergent threads in a single-instruction, multiple-data ("SIMD") architecture by using control instructions to set up thread processing target addresses for synchronization, breaks, and returns.

2. Description of the Related Art

Current graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process in parallel as much graphics data as possible throughout the different parts of the graphics pipeline. Graphics processors with SIMD (single-instruction multiple-data) architectures are designed to maximize the amount of parallel processing in the graphics pipeline. In a SIMD architecture, the same instruction is executed in parallel to process multiple data inputs. Whereas, in a MIMD architecture (multiple-instruction multiple-data), multiple different instructions may be executed in parallel to process multiple data inputs.

A SIMD architecture has inherent processing efficiencies since each instruction is executed synchronously to process the multiple data inputs. Conventional SIMD architectures follow a single flow of control for all threads in the group of execution threads. Therefore, execution threads in a group of threads that is executed synchronously are not able to branch differently (independently) when executing a break or return instruction, so the use of conditional break and return instructions is limited. Conditional break and return instructions in which threads may branch independently are used for advanced control flow in order to improve processing efficiency. In particular, threads that execute a break or return may complete processing earlier than threads that do not execute the break or return. Furthermore, it is desirable to synchronize threads that have diverged during the execution of conditional instructions so that those threads are executed in parallel.

Accordingly, what is needed in the art is branch processing for systems with SIMD architectures that allows for thread divergence and synchronization and the execution of conditional breaks and returns.

SUMMARY OF THE INVENTION

One advantage of the disclosed system is that it enables threads in a multithreaded architecture to be broken into several SIMD thread groups, where the number of threads in each SIMD thread group is based on the size of an active mask. When a branch in a program is encountered, each SIMD thread group is able to traverse the branch independently of the other SIMD thread groups. Thus, the thread groups that do not execute a branch do not have to be disabled while the branch is being executed. Further, the disclosed system provides an efficient mechanism for managing thread divergences within a particular SIMD thread group when that SIMD thread group executes one or more branches in a program. Importantly, the present invention provides a MIMD execution model for individual threads within the SIMD thread groups that are processed in a SIMD architecture.

A parallel processing unit is configured to perform the steps of determining if one or more threads diverge during execution of a conditional control instruction. Control instructions are used to set up thread processing target addresses for synchronization, breaks, and returns. Threads that exit a program are identified as idle by a disable mask. Other threads that are disabled while waiting for an event may be enabled once the divergent threads reach the event. Use of the disable mask allows for the use of conditional return and break instructions in a multithreaded SIMD architecture. The result is a system that operates in full SIMD mode when possible and suffers only minimal performance degradation when thread divergences occur within a particular thread group as a branch is executed.

Various embodiments of a method of the invention for managing divergent threads in a SIMD (single-instruction multiple-data) architecture when processing control instructions include receiving a first control instruction that includes a target address of another instruction in a program, determining that the first control instruction is a set-synchronization instruction, a prebreak instruction, or a prereturn instruction, pushing a token onto an execution stack, updating an active program counter to specify an instruction in the program that is immediately after the first control instruction. The token includes a token type, the target address, and an active mask indicating active threads in a SIMD thread group that should be processed in parallel when the token is popped from the execution stack and execution of the program continues at the target address.

Various embodiments of the invention include a system for managing divergent threads in a SIMD (single-instruction multiple-data) architecture. The system includes an execution stack, a controller that is coupled to the execution stack, a dispatcher that is coupled to the controller, and multiple processing engines that are coupled to the dispatcher. The execution stack is configured to store thread state information for a number of threads that are concurrently executed by the SIMD architecture. The controller is configured to receive program instructions including control instructions and non-control instructions and to execute the control instructions by pushing and popping the thread state information and maintain an active mask that indicates threads in a SIMD thread group that should be processed in parallel. The dispatcher is configured to receive the non-control instructions and the active mask and schedule the non-control instructions for execution. The multiple processing engines are configured to receive the program instructions and execute each program instruction in parallel for threads in the SIMD thread group that should be processed in parallel according to the active mask.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 is a conceptual illustration of how a stack is populated and unwound as a sequence of program instructions is executed in accordance with one or more aspects of the present invention; and FIG. 7 is another conceptual illustration of how a stack is populated and unwound as a sequence of program instructions that includes a conditional return is executed in accordance with one or more aspects of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
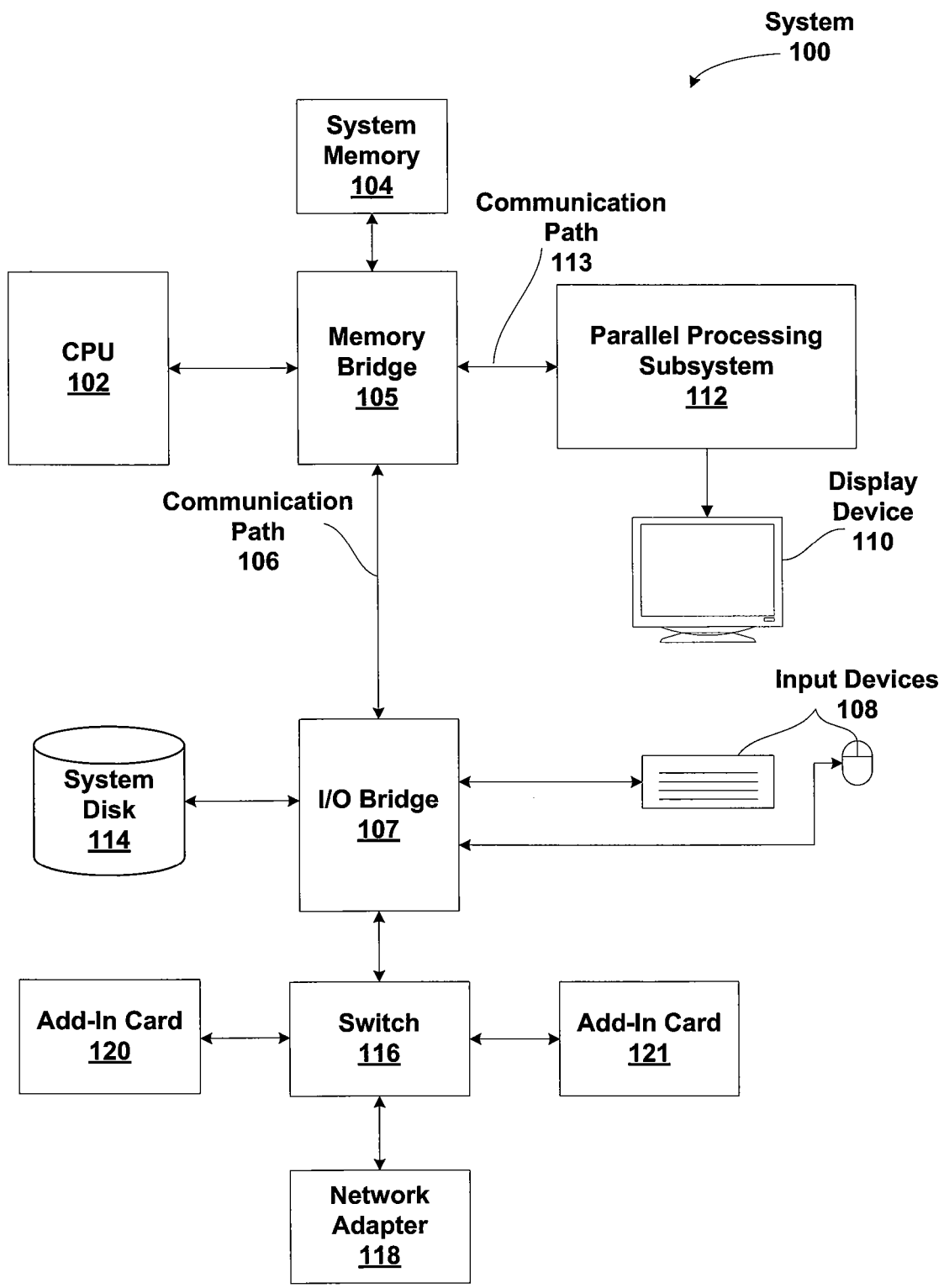
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
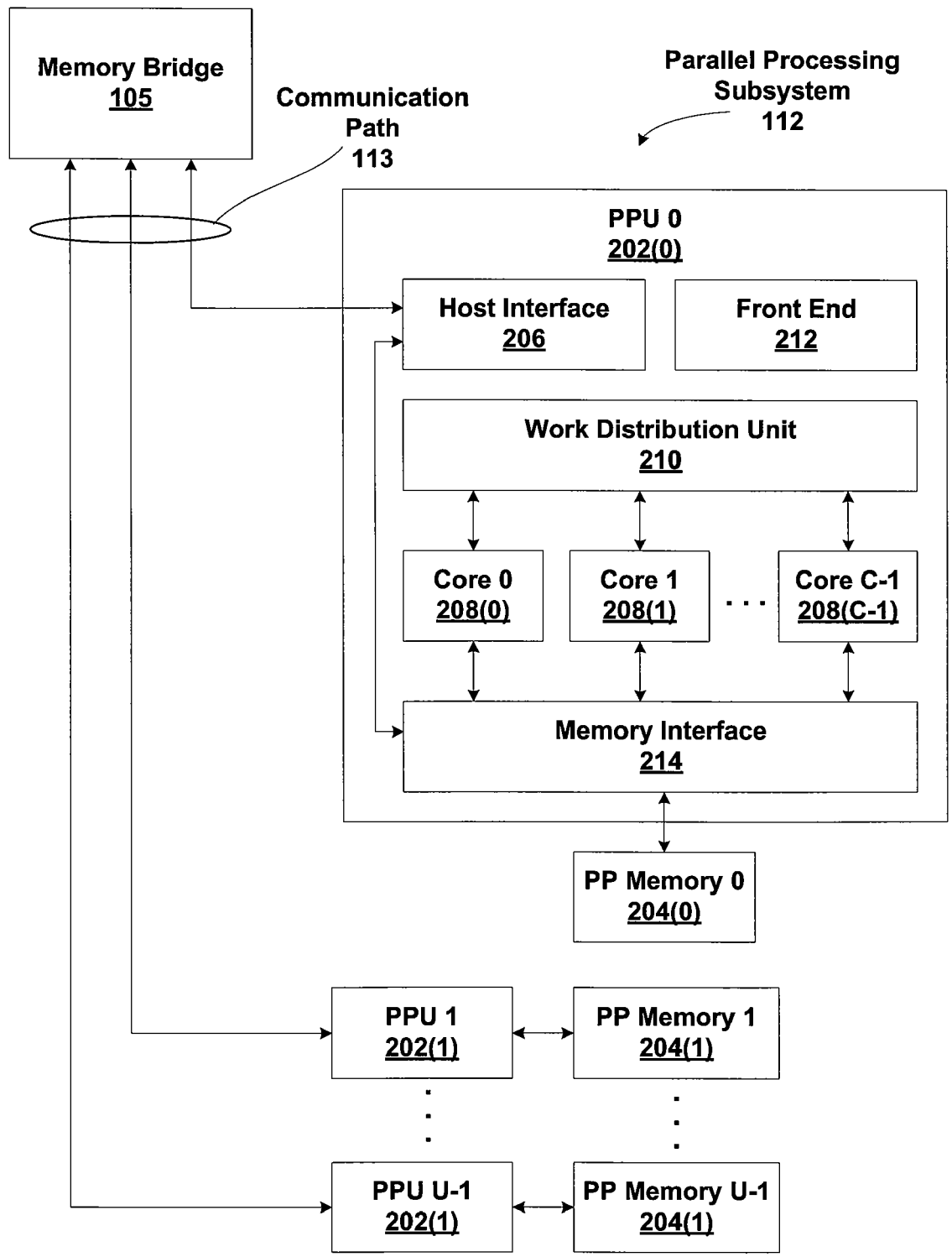
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≧1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
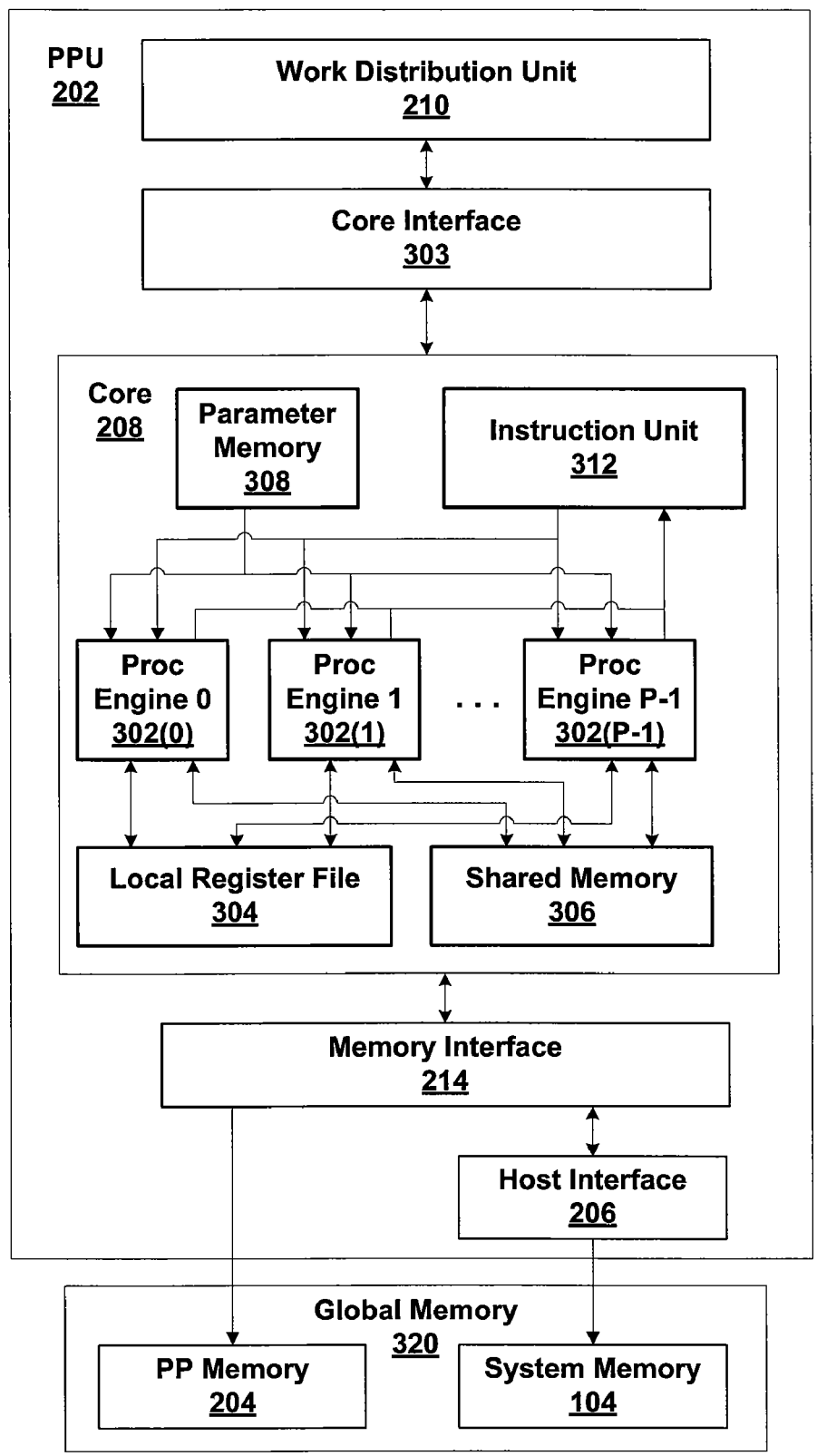
FIG. 3 is a block diagram of a parallel processing unit for the parallel processing subsystem of FIG. 2 in accordance with one or more aspects of the present invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multi-threaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) is issued to all P processing engines 302. Thus, at the level of a single clock cycle, core 208 implements a P-way SIMD microarchitecture. Since each processing engine 302 is also multi-threaded, supporting up to G threads concurrently, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in "SIMD thread groups." As used herein, a "SIMD thread group" refers to a group of up to P threads of execution of the same program on different input data, with one thread of the group being assigned to each processing engine 302. A SIMD thread group may include fewer than P threads, in which case some of processing engines 302 will be idle during cycles when that SIMD thread group is being processed. A SIMD thread group may also include more than P threads, in which case processing will take place over consecutive clock cycles. Since each processing engine 302 can support up to G threads concurrently, it follows that up to G SIMD thread groups can be executing in core 208 at any given time.

On each clock cycle, one instruction is issued to all P threads making up a selected one of the G SIMD thread groups. To indicate which thread is currently active, an "active mask" for the associated thread may be included with the instruction. Processing engine 302 uses the active mask as a context identifier, e.g., to determine which portion of its assigned lane in local register file 304 should be used when executing the instruction. Thus, in a given cycle, all processing engines 302 in core 208 are nominally executing the same instruction for different threads in the same SIMD thread group. (In some instances, some threads in a SIMD thread group may be temporarily idle, e.g., due to conditional or predicated instructions, divergence at branches in the program, or the like.)

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or SIMD thread group in instruction unit 312, then signals instruction unit 312 to begin executing the threads. When execution of a thread or SIMD thread group is completed, core 208 advantageously notifies core interface 303. Core interface 303 can then initiate other processes, e.g., to retrieve output data from shared memory 306 and/or to prepare core 208 for execution of additional threads or SIMD thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Thread Arrays and Cooperative Thread Arrays

In some embodiments, multithreaded processing core 208 of FIG. 3 can execute general-purpose computations using thread arrays. As used herein, a "thread array" is a group consisting of a number (n0) of threads that concurrently execute the same program on an input data set to produce an output data set. Each thread in the thread array is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread arrays are "cooperative" thread arrays, or CTAs. As with other types of thread arrays, a CTA is a group of multiple threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread arrays) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions of an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access.

In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Multithreaded Instruction Processing

Figure 4:
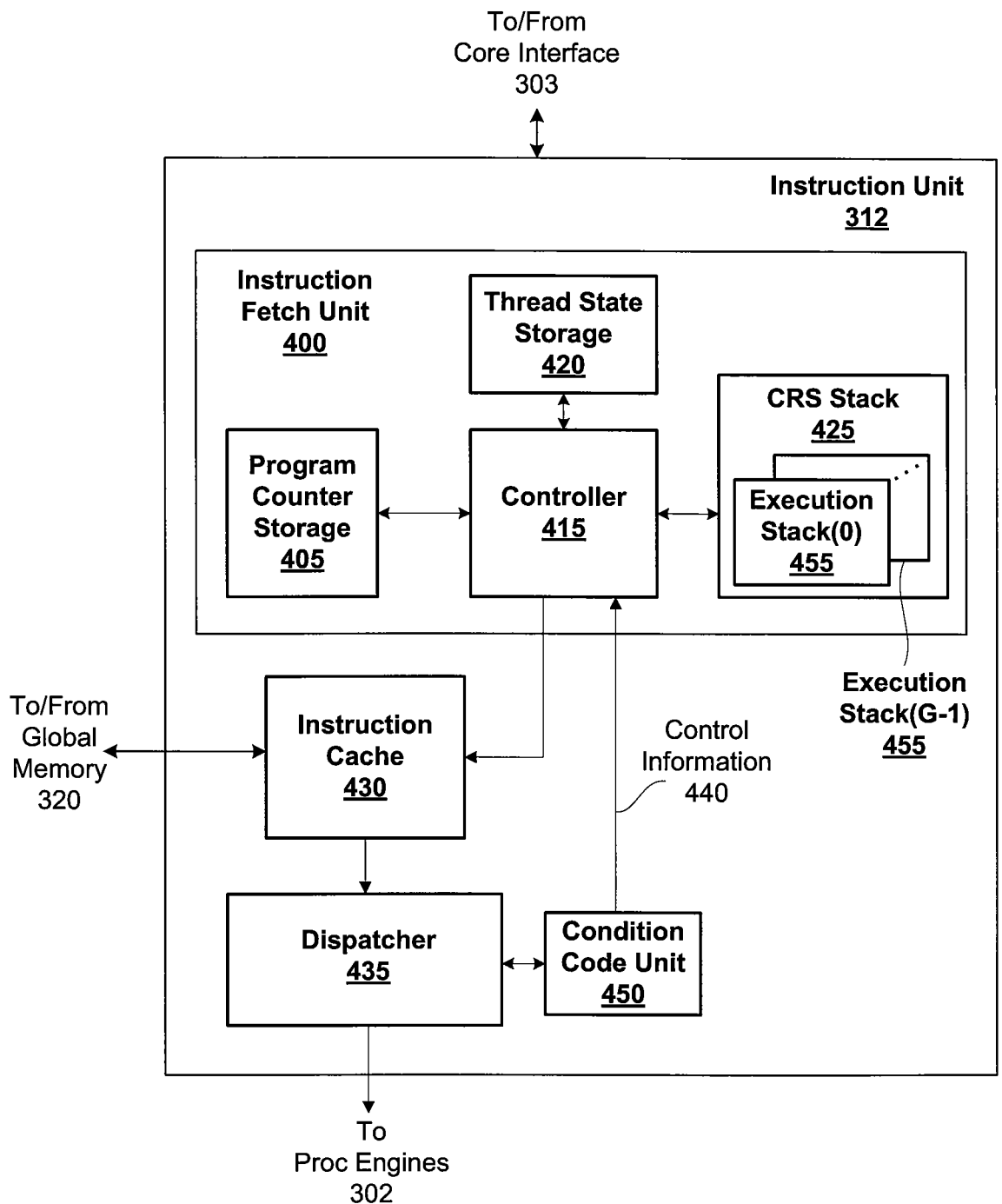
FIG. 4 is a block diagram of an instruction unit for the parallel processing unit of FIG. 3 in accordance with one or more aspects of the present invention.

FIG. 4 is a block diagram of instruction unit 312 for the parallel processing unit 202 of FIG. 3, in accordance with one or more aspects of the present invention. Instruction unit 312 includes an instruction fetch unit 400, instruction cache 430, dispatcher 435, and condition code unit 450. Instruction fetch unit 400 receives data to be processed and a program identifier corresponding to a program that should be used to process the data. A program counter storage 405 stores the active program counter, indicating the next program instruction (INSTR) that should be executed for each SIMD thread group. When G=24, program counter storage 405 stores 24 active program counters. Similarly, thread state storage 420 stores an active mask for each SIMD thread group, where each bit of the active mask corresponds to an integer number of the P, processing engines 302. Therefore, the number of bits in the active mask is the number of threads in a SIMD thread group. Thread state storage 420 also stores a disable mask for each SIMD thread group. The disable mask includes a flag for each one of the threads in the SIMD thread group. The flag indicates if a thread is enabled, disabled for the processing of a conditional return instruction, disabled for the processing of a conditional break instruction, or if the thread has exited the program. The processing of these instructions and determination of the disable mask is described in conjunction with FIGS. 5A, 5B, and 7.

CRS (call, return, synchronization) stack 425 includes an execution stack for each SIMD thread group, shown as execution stacks (0) through (G−1) in FIG. 4. The execution stacks are used during control instruction processing to push and pop tokens that include state information, e.g., token type, token program counter, and token mask. In some embodiments of the present invention, CRS stack 425 may spill entries to global memory 320 for any execution stacks 455 that overflow and restore spilled entries when space is available in CRS stack 425. Controller 415 pushes and pops entries from CRS stack 425 as control instructions are executed. In one embodiment, there are six types of control instructions: conditional branch instructions, call instructions, PreBreak instructions, PreReturn instructions, conditional return instructions, synchronization instructions, and conditional break instructions. Alternative embodiments may include more or fewer types of control instructions as well as different types of control instructions.

Controller 415 provides an active program counter and active mask for a SIMD thread group to instruction cache 430. Instruction cache 430 obtains the instruction corresponding to the active program counter and outputs the instruction and active mask to dispatcher 435. Instruction cache 430 reads the instructions from global memory 320 as needed, using caching techniques known to those skilled in the art. Controller 415 receives control information from condition code unit 450 via control information 440 when a control instruction is executed. The control information includes a token type indicating the type of control instruction, a stack unwind signal, and other data needed to push tokens onto CRS stack 425 and update the active mask and disable mask for the SIMD thread group.

Dispatcher 435 decodes the instruction and outputs conditional data for any conditional control instructions (conditional branch, conditional break, and conditional return) to condition code unit 450. The conditional data includes the condition test and the comparison value (specified by the control instruction) to which the condition code is applied. Conventionally condition codes are used to evaluate the condition test specified by the instruction for a comparison value to produce a true or false result. Six of the eight condition tests for integer values are conventional condition tests, e.g., less than (LT), equal (EQ), greater than (GT), less than or equal (LE), greater than or equal (GE), and not equal (NE). The condition tests are used to determine whether the comparison value is positive, zero, or negative.

When floating point format values are used, the condition tests may also include condition tests that define the behavior for unordered values, such as NaN (not-a-number) values. A NaN does not have an order relative to numeric values, and therefore, can yield unexpected results when used to produce a comparison value or as the input for a conventional condition test. Eight new condition tests, e.g., LEG, U, LTU, EQU, LEU, GTU, NEU, and GEU, provide for explicit handling of NaN values. LEG (less than, equal, or greater than) is only true when the comparison value is zero, positive, or negative, i.e., ordered. U (unordered) is only true when the comparison value is unordered, i.e., NaN. LTU (less than zero or unordered) is true when the comparison value is negative or NaN. EQU (equal to zero or unordered) is only true when the comparison value is zero or NaN. LEU (less than or equal to zero or unordered) is only true when the comparison value is negative, zero, or NaN. GTU (greater than zero or unordered) is only true when the comparison value is positive or NaN. NEU (not equal to zero or unordered) is only true when the comparison value is positive, negative, or NaN. GEU (greater than or equal to zero or unordered) is only true when the comparison value is positive, zero, or NaN.

The other two conventional condition tests (for integer and floating point values) are always (TR) and never (FL). Additional condition tests, such as overflow and carry, may also be used and the number of condition tests is increased accordingly. The comparison value may be computed during execution of the program and each thread in the SIMD thread group may have a comparison value. Therefore, some threads may produce a true result while others produce a false result, when the condition test is evaluated. When one or more active threads produce a different condition test result than other active threads, the threads diverge and CRS stack 435 is used to store a token including an active mask and program counter for the side of the branch that will be executed after a first side of the branch has completed execution.

In addition to the conditional data, dispatcher also outputs the control instruction (call, break, return, branch, or the like), any target program counter (address) specified by the instruction, and active mask to condition code unit 450. Control instructions are not output to processing engines 203 by dispatcher 435. Instead, condition code unit 450 determines a "taken" mask based on the active mask that is included in the control information output to controller 415 by condition code unit 450. Specifically, condition code unit 450 uses the condition test result to determine a "taken mask" that indicates the active threads which evaluate to TRUE for the condition test specified by the instruction. Bits of the taken mask that correspond to threads in the SIMD thread group that correspond to a true comparison test result are cleared. The active mask and taken mask may be used by controller 415 to update the disable mask.

Condition code unit 450 outputs the taken mask and token type to controller 415 via control information 440. When a target program counter is specified by a call or branch control instruction, the taken program counter is output by condition code unit 450 to controller 415 via control information 440. The token type indicates the type of control instruction that was executed to produce the disable mask. Token types include: sync, call, diverge, and break. Note, that when a control instruction for a thread is in-flight, i.e., output by controller 415 and not yet received by controller 415 via control information 440, another instruction for the same thread should not be output by controller 415.

Other instructions (non-control instructions), received by dispatcher 435 are queued for output to processing engines 302. Dispatcher 435 may be configured to output instructions based on the availability of (computational or storage) resources that are needed to process the instruction. In some embodiments of dispatcher 435, a scoreboarding scheme is used to track resource availability and determine which instructions can be output to processing engines 302. When processing engines 203 receive an instruction, a read request is generated to obtain any operands that are needed to execute the instruction and the read request is output to LRF 304 or shared memory 306. The instruction is then processed by processing engines 302 when the operands have been obtained.

Figure 5A:
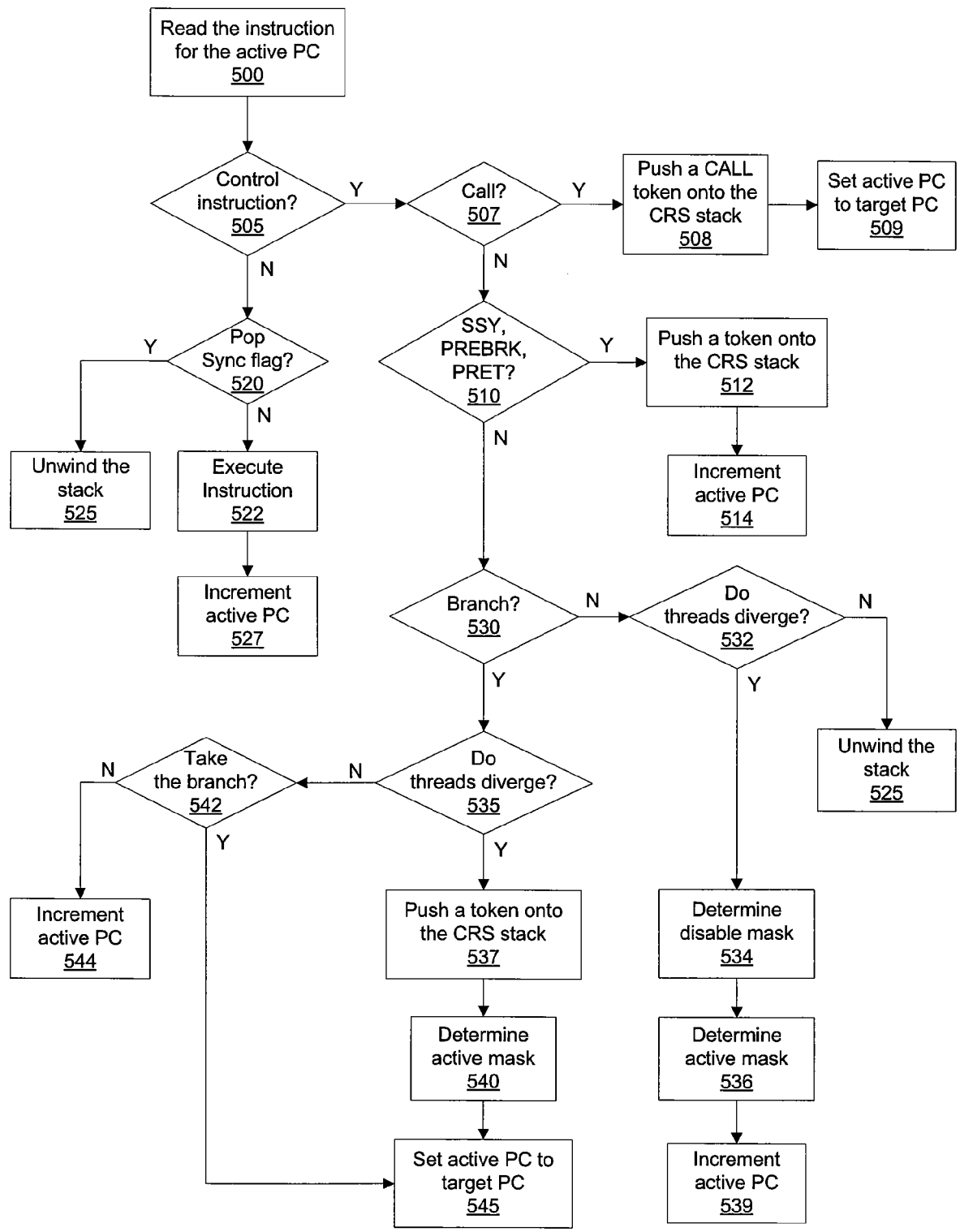
FIG. 5A is a flow diagram of method steps for processing a series of program instructions in accordance with one or more aspects of the present invention.

FIG. 5A is a flow diagram of method steps for processing a series of program instructions, in accordance with one or more aspects of the present invention. Persons skilled in the art will understand that any system configured to perform the method steps, in any order, is within the scope of the present invention. In step 500 controller 415 fetches the program instruction corresponding to the current setting of the active program counter (PC) for a thread by outputting the active program counter to instruction cache 430. In step 505, dispatcher 435 determines whether the instruction is a control instruction. If dispatcher 435 determines that the instruction is a control instruction, then the method proceeds to step 507, where dispatcher 435 outputs the control instruction to condition code unit 450 and condition code unit 450 determines whether the control instruction is a call instruction.

If condition code unit 450 determines that the instruction is a call instruction, then the method proceeds to step 508 and condition code unit 450 outputs control information, including the token type of CALL, the target program counter (specified by the call instruction), the taken mask (equal to the active mask), and the token program counter. The token program counter is the return address for a subroutine call, and equals the active program counter incremented to point to the next program instruction for the thread, i.e., the "not taken" program counter. Since call instructions are not conditional, the taken mask is equal to the active mask. The control information may also include disable mask that was received from dispatcher 435. In step 509 controller 415 sets the active program counter stored for the SIMD thread group in program counter storage 405 to the target program counter in order to execute the call instruction. Since the call instruction increases the nesting level by pushing a token onto CRS stack 425, the disable mask is unchanged. The disable mask is changed when an instruction that decreases the nesting level is executed and a token is popped from CRS stack 425.

The different tokens that are pushed onto CRS stack 425 for each control instruction are summarized in TABLE 1. In some embodiments of the present invention each entry of CRS stack 425 is 64 bits. A token includes the token type, mask (token mask), and a token program counter that specifies where execution of the SIMD thread group should resume when the token is popped. Token types ID_SYNC, ID_DIVERGE, ID_CALL, and ID_BREAK correspond to the SSY instruction, branch (BRA and BRX) instructions, the CALL and PreReturn (PRET) instructions, and the PreBreak (PREBRK) instruction, respectively. The mask included in a call token is the active mask that existed when the call/return branch was encountered (active_mask), and the program counter in a call token is the return program counter (not_taken_pc). The return program counter specifies the instruction in the program subsequent to the call instruction (i.e., the fall-through instruction) that equals the incremented active program counter.

TABLE 1

| Instruction | Divergent? | Push on CRS stack |
| --- | --- | --- |
| SSY | — | {ID_SYNC, active_mask, target_pc} |
| BRA #f | — | — |
| BRA | N | — |
| BRA | Y | {ID_DIVERGE, not_taken_mask, not_taken_pc} |
| BRX | N | — |
| BRX | Y(1) | {ID_DIVERGE, not_taken_mask, active_pc} |
| BRX | Y(2) | {ID_DIVERGE, not_taken_mask, not_taken_pc} |
| CALL | — | {ID_CALL, active_mask, not_taken_pc} |
| PRET | — | {ID_CALL, active_mask, target_pc} |
| PREBRK | — | {ID_BREAK, active_mask, target_pc} |

If, in step 507 condition code unit 450 determines that the control instruction is not a call instruction, then the method proceeds to step 510, where condition code unit 450 determines if the control instruction is a SSY (set synchronization), PreBreak, or PreReturn instruction. If condition code unit 450 determines that the control instruction is a SSY, PREBRK, or PRET instruction, then in step 512 condition code unit 450 outputs control information, including the token type of SSY (sync), PREBRK (prebreak), or PRET (prereturn), the active mask as the taken mask, and the target_pc (target program counter) that was specified by the instruction to controller 415 as the token program counter, and controller 415 pushes a token onto CRS stack 425. The token mask included in the token is the active mask and since SSY, PREBRK, and PRET instructions push tokens onto CRS stack 425, the disable mask is unchanged. In step 514 controller 415 increments the active program counter stored for the thread in program counter storage 405 to point to the next instruction for the thread.

Returning now to step 505, if dispatcher 435 determines that the instruction is not a control instruction, then the method proceeds to step 520, and dispatcher 435 determines if the instruction includes a pop sync (synchronization) flag, indicating that the threads in the SIMD thread group should be synchronized. A pop sync flag has the opposite meaning of a SSY instruction. A pop sync flag indicates that the threads in the SIMD thread group that have diverged since the last SSY instruction caused a sync token (token type SSY) to be pushed onto CRS stack 425 are to be executed to the instruction that includes the pop sync flag. As described in further detail herein, this process reestablishes the level of thread synchronization that existed when this last sync token was pushed onto CRS stack 425. In other words, the process reestablishes the level of thread synchronization that existed when the last SSY instruction was encountered and begins executing at the target address specified by the last SSY instruction (the token program counter of the SSY token). In the preferred embodiment, the synchronization operation takes place before the other operations of the carrier instruction (i.e., the instruction that includes the pop sync flag). In alternative embodiments, though, the synchronization operation may be carried out using a separate instruction or the synchronization operation can take place after the other operations of the carrier instruction. Note that control instructions cannot be carrier instructions for the pop sync flag.

If, in step 520 dispatcher 435 determines that the instruction does include a pop sync flag, then in step 525 dispatcher 435 outputs control information to controller 415 via condition code unit 450 and controller 415 proceeds to unwind CRS stack 425 in order to synchronize the (active) threads in the SIMD thread group. The control information output to controller 415 includes an unwind stack signal that indicates that CRS stack 425 should be unwound. The carrier instruction will be executed after the stack is unwound and the active threads are synchronized. The details of step 525 are described in conjunction with FIG. 5B.

If, in step 520 dispatcher 435 determines that the instruction does not include a pop sync flag, then in step 522, dispatcher 435 outputs the instruction to processing engines 302 for execution. In step 527 dispatcher 435 outputs control information, including an increment PC signal, to controller 415 via condition code unit 450 and controller 415 increments the active program counter stored in program counter storage 405 for the thread. Alternatively, the incremented active program counter is output to controller 415.

Returning now to step 510, if condition code unit 450 determines that the control instruction is not a SSY, PREBRK, or PRET instruction, then in step 530 condition code unit 450 determines if the control instruction is a branch instruction. Branch instructions include non-conditional branch and conditional branch instructions (BRA) and non-conditional indirect branch and conditional indirect branch instructions (BRX).

Indirect branch instructions may be used to allow greater flexibility since the branch address (target address) does not need to be determined at compile time. A branch target register stores a branch address that is used for all of the threads in a SIMD thread group. The branch target register may be written during execution of the program with a computed value. Alternatively, each of the threads in a SIMD thread group may specify a different branch address for an indirect branch instruction, resulting in the Y(1) divergence shown in TABLE 1. The branch address(es) are read using indices for each allowing for P-way indirect branching. The indirect branch instruction is executed for each unique branch address and the last unique branch address, results in the Y(2) divergence shown in TABLE 1, where the not taken program counter is pushed onto CRS stack 425.

If, in step 530 condition code unit 450 determines that the control instruction is not a branch instruction, then it is a return or break instruction, and the end of a subroutine associated with a call/return branch or the end of a loop of instructions associated with a PreBreak branch has been reached, and the method proceeds to step 532. In step 532 condition code unit 450 produces a taken mask that is output to controller 415 and controller 415 determines if one or more of the active threads diverge based on the condition test result. Any of the active threads that evaluate true for the condition test specified by a conditional return or break instruction are disabled according to the taken mask. Those threads are disabled and remain idle while the other active threads (that evaluate false for the condition test) continue executing. Any bits corresponding to disabled threads are cleared in the taken mask, so that the number of bits that are set in the taken mask is no greater than the number of bits that are set in the active mask.

If, in step 532 controller 415 determines that the threads do not diverge (the taken mask equals the active mask), then in step 525 controller 415 proceeds to unwind CRS stack 425. During the unwind process, threads that have been disabled by return or break instructions are enabled when a corresponding call token (ID_CALL) or prebreak token (ID_BREAK) is popped from CRS stack 425, as further described in conjunction with FIG. 5B.

If, in step 532 controller 415 determines that the threads do diverge (the taken mask is not equal to the active mask), then in step 534 controller 415 determines a modified disable mask. The disable mask state for those threads is set to a value indicating that the threads whose taken_mask bit is set are idle while waiting for a particular event. The event can be the end of the program or for a particular token to be popped from CRS stack 425.

In some embodiments of the present invention, a disable state of 0 indicates that the thread is enabled, a disable state of 1 indicates that the thread executed a return instruction and is disabled until a matching call token is popped off CRS stack 425, a disable state of 2 indicates that the thread executed a break instruction and is disabled until a matching prebreak token is popped off CRS stack 425, and a disable state of 3 indicates that the thread exited and is disabled throughout the remainder of the program.

In step 536 controller 415 modifies the active mask. Specifically, bits in the active mask that correspond to threads in the SIMD thread group that "take the condition" are cleared, causing those threads to appear as not active. In other words, a bitwise XOR (exclusive OR) is performed between the taken mask and the active mask to produce a modified active mask. In step 539 controller 415 increments the active program counter in order to execute the next instruction for the thread.

Returning now to step 530, if condition code unit 450 determines that the control instruction is a branch instruction, then in step 535 controller 415 determines if any of the active threads diverge based on the taken mask provided by condition code unit 450. In step 535 condition code unit 450 outputs the control information to controller 415 that includes the taken mask, token type, and the target program counter. If, in step 535 controller 415 determines that at least one active thread diverges from the other active threads in the SIMD thread group, then in step 537 controller 415 pushes a diverge token (ID_DIVERGE) onto CRS stack 425. The token mask included in the token is the not taken mask (not_taken_mask) which indicates the active threads that did not evaluate TRUE for the condition test, i.e., did not take the branch. Controller 415 may determine the token mask using the taken mask and the active mask. The token program counter equals the active program counter incremented to specify the next instruction in the thread.

In step 540 controller 415 determines the active mask as the taken mask which indicates the active threads that evaluated TRUE for the condition test, i.e., did take the branch. In step 545 controller 415 sets the active program counter to the target program counter (address) specified by the branch instruction.

If, in step 535 controller 415 determines that none of the active threads diverge, then in step 542 controller 415 determines if all of the active threads take the branch. The alternative is that none of the active threads take the branch, in which case, condition code unit 450 outputs a taken mask equal to 0x0000. In step 544 controller 415 increments the active program counter stored in program counter storage 405 for the SIMD thread group in order to execute the next instruction in the thread. If, in step 542 controller 415 determines that all of the active threads take the branch, then in step 545 controller 415 updates the active program counter to equal the target program counter (address) specified by the branch instruction, to controller 415 and controller 415 stores the modified active program counter in program counter storage 405 for the SIMD thread group in order to execute the instructions specified by the branch.

Using CRS stack 425 allows PPU 202 to process SIMD thread groups while allowing thread divergence and synchronization. The disable mask is used to support more advanced control flow, including conditional returns and breaks, returns from within prebreak-break loops, and thread completion inside nested conditionals and subroutines. A single disable mask is stored for each SIMD thread group in thread state storage 420 and the disable masks are combined with tokens popped from CRS stack 425 to resume execution of threads within the SIMD thread group that are disabled.

Figure 5B:
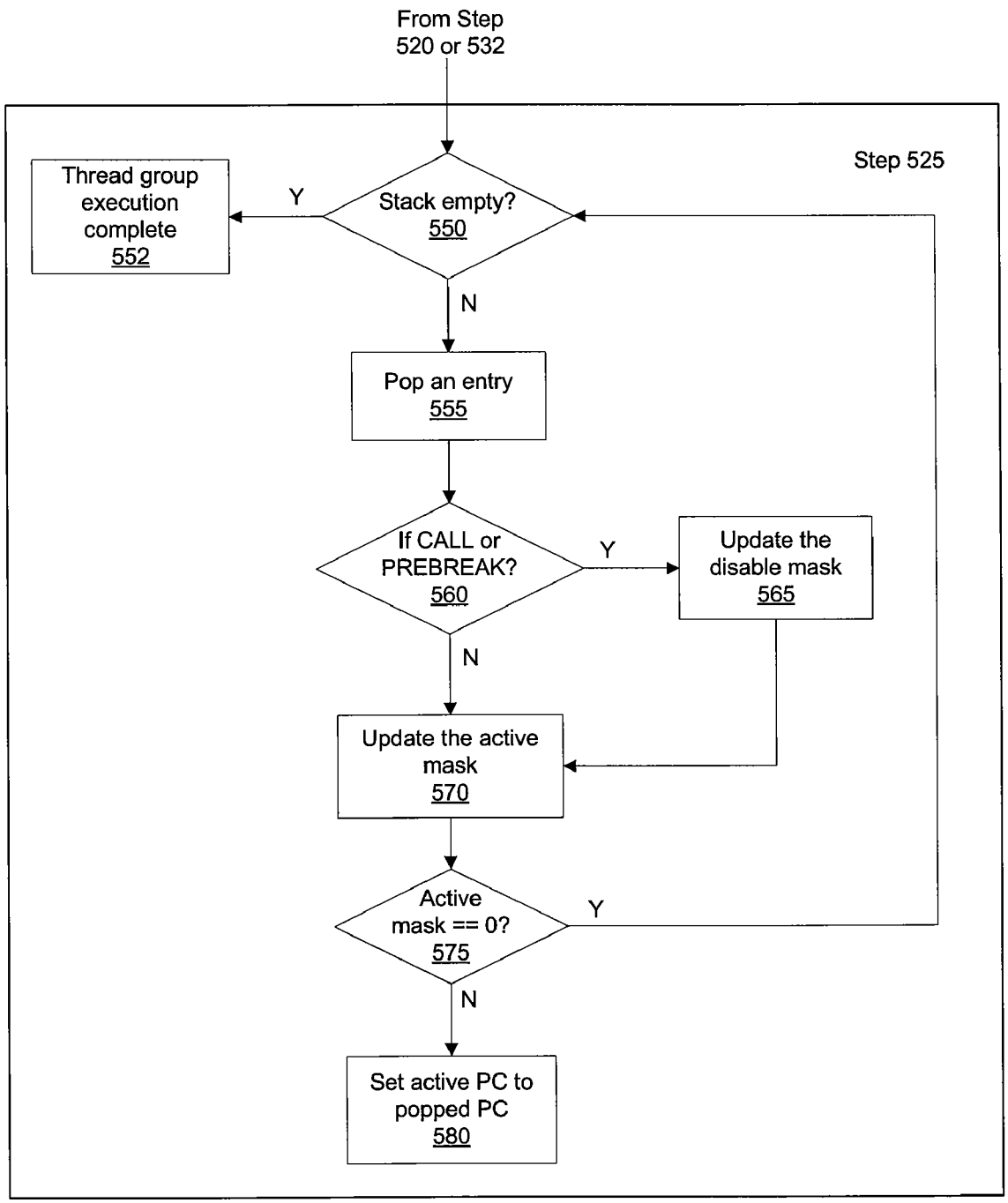
FIG. 5B is a flow diagram of method steps for unwinding an execution stack during the execution of a series of program instructions in accordance with one or more aspects of the present invention.

FIG. 5B is a flow diagram of method steps for unwinding CRS stack 425 to complete step 525 of FIG. 5A, in accordance with one or more aspects of the present invention. CRS stack 425 includes an execution stack 445 for each of the G thread groups that may be executed concurrently by processing engines 302, so that each thread group may progress independently of the other thread groups. In step 550, controller 415 determines if the execution stack 445 for the thread group is empty, and, if so, then in step 552 execution of the thread group is complete and instruction unit 312 notifies core interface 303 that the thread group has completed execution. If, in step 550 controller 415 determines that the execution stack 445 is not empty, then in step 555 controller 415 pops from the execution stack 445 the token on the top of execution stack 445. In step 560 controller 415 determines if the token is a call or prebreak token, and proceeds directly to step 570 when the token is not a call or prebreak token.

A call token indicates that all of the threads in the SIMD thread group corresponding to a bit that is enabled in the token mask have completed execution of a conditional return instruction and any threads that were disabled (according to the disable mask) should be enabled. A prebreak token indicates that all of the active threads in the SIMD thread group corresponding to a bit that is enabled in the token mask have completed execution of a conditional break instruction and any threads that were disabled (according to the disable mask) should be enabled. The active threads in the SIMD thread group are indicated by the mask stored with the token, i.e. the token mask. Importantly, the disable mask is used to disable threads in the SIMD thread group so that call and prebreak loops can be nested. If, in step 560 controller 415 determines that the token is a call or prebreak token, then in step 565 controller 415 updates the disable mask for the thread. Specifically, when the token is a call token, controller 415 resets the disable state for all threads with a disable state of 1, indicating that the thread was disabled by a conditional return instruction, and are active according to the call token's mask. When the token is a prebreak token, controller 415 resets the disable state for all threads with a disable state of 2, indicating that the thread was disabled by a conditional break instruction, and are active according to the prebreak token's mask.

If, in step 560 controller 415 determines if the token is neither a call or prebreak token, then the token is either a sync or diverge token. In step 570 controller 415 updates the active mask by setting the active mask to the mask from the token, and then removing threads that are disabled. Specifically, any threads that have a disable state indicating that they are disabled have their corresponding bit in the updated active mask (from the token) cleared to prevent those threads from incorrectly resuming execution. This insures that threads remain inactive as long as their disable state indicates that they are not enabled. In other words, the active mask is updated to disable processing of any of the threads in the SIMD thread group that are waiting for other threads in the SIMD thread group to complete execution of a conditional break or return branch.

In step 575 controller 415 determines if the updated active mask is equal to zero, indicating that none of the threads in the SIMD thread group are active. If, in step 575 controller 415 determines that none of the threads are active, then the method returns to step 550 to pop another token (or complete execution of the program). Otherwise, in step 580 controller 415 sets the active program counter to the program counter from the token that was popped in step 555.

Referring back to Table 4, the program counter in a call token is the return program counter. Setting the active program counter equal to the return program counter stipulates that the active threads return to the instruction in the program subsequent to the call instruction (i.e., the fall-through instruction). The program counter in a break token is the after-loop program counter. Setting the active program counter to the after-loop program counter stipulates that the active threads branch to the instruction having the address designated by the after-loop program counter.

The mask included in a sync token is the active mask that existed when the corresponding SSY instruction was executed. Thus, setting the active mask equal to the mask included in the sync token, activates all of the threads that were active when that SSY instruction was originally encountered, excluding threads that are disabled due to an intervening conditional return or break instruction. The program counter included in the sync token is the program counter that was specified by the SSY instruction.

The mask included in a divergence token for a branch and indirect branch is the not taken mask. In one embodiment, setting the active mask to the not-taken mask has the effect of activating the threads that need to execute the if-side of the conditional branch associated with the divergence token, while inactivating the threads that just completed executing the else-side of that branch. The program counter included in a divergence token for a branch and indirect branch with 2-way divergence is the not taken program counter. Setting the active program counter to the not taken program counter stipulates that the newly activated threads execute the first instruction on the if-side of the conditional branch. This process enables the execution of the if-side of the conditional branch. The program counter included in a divergence token for an indirect branch with P-way divergence is the active program counter. Therefore, the BRX instruction will be executed for each unique branch address.

TABLE 2 sets forth the C programming language pseudo-code for the method steps of FIG. 5B, where disable_mask.return is asserted when a thread is waiting for a call token, disable_mask.break is asserted when a thread is waiting for a break token, and disable_mask.eos is asserted when a thread has exited the program. As previously described in conjunction with FIG. 5A, in some embodiments of the present invention, a disable state of 1 indicates that the thread executed a return instruction and is disabled until a matching call token is popped off CRS stack 425, a disable state of 2 indicates that the thread executed a break instruction and is disabled until a matching prebreak token is popped off CRS stack 425, and a disable state of 3 indicates that the thread exited and is disabled throughout the remainder of the program. Therefore, in those embodiments, disable_mask.return is asserted when the disable state is 1, disable_mask.break is asserted when the disable state is 2, and disable_mask.eos is asserted when the disable state is 3.

TABLE 2

```
sub UnwindStack {
    // Pop stack until we find a non-zero active mask
    do {
        if ( stack_is_empty() ) {
            if ( disable_mask.break != 0 )
                _ERROR_;
            else
                _END_PROGRAM_NORMALLY_
        }
        {id, mask, pc} = pop();
        // Re-enable threads that are waiting on this stack entry
        if ( id == ID_CALL )
            disable_mask.return    &= ~mask;
        else if ( id == ID_BREAK )
            disable_mask.break    &= ~mask;
        // For convenience, create a tmp mask of disabled threads
        U32 disabled    = disable_mask.break
                        | disable_mask.return
                        | disable_mask.eos;
        // Update active mask
        active_mask = mask & ~disabled;
        // Update PC from the top-of-stack
        active_pc    = pc;
    } while ( active_mask == 0 );    // Loop until we find a valid thread
}
```

The disable mask is used to process conditional returns and breaks, returns from within prebreak-break loops, and thread completion inside nested conditionals and subroutines. An alternative to using the disable mask is to walk the execution stack 445 when a thread-disabling event occurs (conditional return or break) and modify saved active masks in all of the relevant tokens. However, walking execution stack 445 is potentially time consuming since execution stack 445 can be very deep, with portions stored in global memory 320. Therefore, the disable mask is advantageous in terms of performance and requires only a single mask for each of the G threads that may execute concurrently.

TABLE 3 is a set of program instructions including branch instructions implementing an if-then-else statement for illustrating one or more aspects of the present invention. As shown, the leftmost column sets forth the program counter associated with each program instruction and the rightmost column sets forth the various program instructions in the set. The program instructions are presented in assembly pseudo-code for ease of presentation.

TABLE 3

Standard if-else-endif block:

| | |
|---|---|
| 0: | MAD |
| 1: | SSY LABEL1 |
| 2: | BRA LT.x, LABEL0 |
| 3: | MUL |
| 4: | MUL |
| 5: | BRA LABEL1 |
| LABEL0: | |
| 6: | ADD |
| LABEL1: | |
| 7: | MAX.S (wait for sync) |

FIG. 6 is a conceptual illustration of how an execution stack within CRS stack 425 is populated and unwound as the sequence of program instructions shown in TABLE 3 is executed, in accordance with one or more aspects of the present invention.

As shown, a column 600 sets forth the order in which instruction unit 312 executes the program instructions and specifies the active program counter when each such program instruction is executed. A column 605 sets forth the value of the active mask before each program instruction is executed. For purposes of discussion only, the SIMD thread group is assumed to include eight threads, and all eight threads initially are active. The initial value of the active mask is therefore 0xff. Also, the active program counter is assumed to have an initial value of 0.

Controller 415 first fetches the MAD instruction, which corresponds to a program counter value of 0 (step 500). Since the MAD instruction is not a control instruction and does not include a pop-sync flag, processing engines 302 execute this instruction (step 522) and the active program counter is incremented (step 527) to 0x1. Controller 415 then fetches the SSY instruction and pushes a sync token, including the token type SYNC, active mask (0xff), and the target program counter specified by the SSY instruction (LABEL1, PC=7) onto execution stack 445 (step 512). A column 610 sets forth the token that is at the top of execution stack 445 after each program instruction is executed. The active program counter is incremented (step 514) to 0x2.

Controller 415 then fetches the BRA LT.x instruction that branches to the target program counter address LABEL0 (PC=6) if condition x is less than zero. The BRA instruction is a conditional branch instruction and the condition test is used for determining the branch taken path and the not-taken path. Six threads are assumed to satisfy the condition test specified by the BRA instruction (i.e., x is less than 0) and, thus, take the branch and execute the else-side of the if-then-else statement. Since one or more active threads diverge, controller 415 pushes a divergence token (DIV) onto execution stack 445 (step 537). A column 615 sets forth the token that is one entry below the top of execution stack 445, TOS-1 (top of stack minus one) after each program instruction is executed.

The mask included in the divergence token has a value of 0x0c, which is the not taken mask and reflects the two threads that did not satisfy the condition test. These two threads execute the fall-through if-side of the conditional branch, as opposed to the branch-taken else-side. The taken mask is 0xf3 and the active mask is set to the taken mask. The program counter included in the divergence token has a value of 0x3, which is the not taken program counter and reflects the address of the first instruction associated with the if-side of the conditional branch (i.e., the fall-through instruction). Finally, the active program counter is set to the target program counter (step 545) to 0x6.

Controller 415 then fetches the ADD instruction. Since the ADD instruction is not a control instruction and does not include a pop-sync flag, processing engines 302 execute this instruction (step 522) and the active program counter is incremented (step 527) to 0x7. Controller 415 then fetches the MAX.S instruction which includes a pop-sync flag (.S). The pop-sync flag is specifies that the instruction is a synchronization point in the program. Since the pop-sync flag is included, controller 415 unwinds execution stack 445 (step 525) by popping the divergence token (step 555) that was pushed by BRA LT.x, and updating the active mask to 0xc and setting the active program counter to 0x3 (steps 570, 575, and 580). Controller 415 then fetches the MUL instruction (if-side of the conditional branch). Since the MUL instruction is not a control instruction and does not include a pop-sync flag, processing engines 302 execute this instruction (step 522) and the active program counter is incremented (step 527) to 0x4.

Controller 415 then fetches the next MUL instruction (second instruction for the if-side of the conditional branch). Since this MUL instruction is also not a control instruction and does not include a pop-sync flag, processing engines 302 execute this instruction (step 522) and the active program counter is incremented (step 527) to 0x5.

Controller 415 then fetches the BRA instruction that specifies a target program counter of LABEL1 (PC=7). The BRA instruction is an unconditional instruction which is always taken, therefore the active threads do not diverge. Since all of the active threads take the branch, the active program counter is set to the target program counter of 0x7 (steps 535, 542, and 545)

Controller 415 then fetches the MAX.S instruction which includes a pop-sync flag (.S) and unwinds the execution stack (step 525) by popping the sync token (step 555) that was pushed by SSY and updating the active mask to 0xff and setting the active program counter to 0x7 (steps 570, 575, and 580). Controller 415 then fetches the MAX.S instruction and since the threads are synchronized (the active mask is 0xff), processing engines 302 execute this instruction (step 522) and the active program counter is incremented (step 527) to 0x8. Note that controller 415 must ignore the pop-sync flag, after execution stack 455 has been unwound to process the .S portion of the MAX.S instruction, in order to execute the carrier instruction (MAX). Therefore, when the sync token is popped, controller 415 maintains a bit of state for each SIMD thread group that is set when a sync token is popped and cleared when the carrier instruction is executed.

TABLE 4 is a set of program instructions for illustrating one or more aspects of the present invention. As shown, the leftmost column sets forth the program counter associated with each program instruction and the rightmost column sets forth the various program instructions in the set. The program instructions are presented in assembly pseudo-code for ease of presentation.

TABLE 4

| | | |
|---|---|---|
| 50: | CALL SUBROUTINE | |
| 51: | ADD | |
| SUBROUTINE: | | |
| 0: | SSY LABEL1 | |
| 1: | BRA LT.x, LABEL0 | (taken = 0xf3) |
| 2: | MUL | |
| 3: | MUL | |
| 4: | BRA LABEL1 | |
| LABEL0: | | |

TABLE 4-continued

| | | |
|---|---|---|
| 5: | RET GT.x | (taken = 0x3) |
| 6: | ADD | |
| LABEL1: | | |
| 7: | MUL.S (wait for sync) | |
| 8: | RET | |

TABLE 5 sets forth the C programming language pseudo-code for the subroutine portion of the program instructions of TABLE 4.

TABLE 5

```
Nested if-else-endif with conditional return:
Subroutine {
    if(GE){
        b = c*d;
        c = d*e;
    } else {
        if ( GT )
            return;
        d = e + f;
    }
    g = c*d;
}
```

FIG. 7 is another conceptual illustration of how an execution stack 445 within execution stack 445 is populated and unwound as the sequence of program instructions shown in TABLES 4 and 5 that include a conditional return, is executed, in accordance with one or more aspects of the present invention. As shown, a column 700 sets forth the order in which instruction unit 312 executes the program instructions and specifies the active program counter when each such program instruction is executed. A column 705 sets forth the value of the active mask before each program instruction is executed. A column 710 sets forth the value of the disable mask before each program instruction is executed. For purposes of discussion only, the SIMD thread group is assumed to include eight threads, and all eight threads initially are active. The initial value of the active mask is therefore 0xff. Also, the active program counter is assumed to have an initial value of 50.

Controller 415 first fetches CALL instruction at address 50 that specifies a target program counter of SUBROUTINE (PC=0). A call token, including the token type CALL, active mask (0xff), and the target program counter, is pushed onto execution stack 445 (step 508). Since all of the active threads take the call, the active program counter is set to the target program counter of 0x0 (step 509). A column 715 sets forth the token that is at the top of execution stack 445 after each program instruction is executed.

Controller 415 then fetches the SSY instruction and pushes a sync token, including the token type SYNC, active mask (0xff), and the target program counter specified by the SSY instruction (LABEL1, PC=7) onto execution stack 445 (step 512). A column 720 sets forth the token that is one entry below the top of execution stack 445, TOS-1 (top of stack minus one) after each program instruction is executed. The active program counter is incremented (step 514) to 0x2.

Controller 415 then fetches the BRA instruction that specifies the LT condition test with a comparison value specified by x and a target program counter of LABEL0 (PC=6). Since one or more active threads diverge, controller 415 pushes a divergence token (DIV) onto execution stack 445 (step 537). A column 725 sets forth the token that is two entries below the top of execution stack 445, TOS-2 (top of stack minus two) after each program instruction is executed.

The mask included in the divergence token has a value of 0x0c, which is the not taken mask and reflects the two threads that did not satisfy the inverted condition test. These two threads execute the fall-through if-side of the conditional branch, as opposed to the else-side. The taken mask is 0xf3 and the active mask is set equal to the taken mask (step 540), as shown in column 705. The program counter included in the divergence token has a value of 0x2, which is the not taken program counter and reflects the address of the first instruction associated with the if-side of the conditional branch (i.e., the fall-through instruction). Finally, the active program counter is set to the target program counter (step 545) to 0x5.

Controller 415 then fetches the RET instruction that specifies the GT condition test with a comparison value specified by x. Since one or more active threads diverge, condition code unit 450 determines a disable mask (step 534). The modified disable mask is 0x0005 (each thread has a 2 bit flag) since two of the active threads satisfy the condition test and have flags set to 1, indicating disable states that are waiting for a call instruction. Condition code unit 450 modifies the active mask to disable execution of the disabled threads. Therefore, the active mask is changed from 0xf3 to 0xf0 (step 536). Finally, the active program counter is incremented to a value of 0x6 (step 539).

Controller 415 then fetches the ADD instruction. Since the ADD instruction is not a control instruction and does not include a pop-sync flag, processing engines 302 execute this instruction (step 522) and the active program counter is incremented (step 527) to 0x7. Controller 415 then fetches the MUL.S instruction which includes a pop-sync flag (.S). Since the pop-sync flag is included, controller 415 unwinds execution stack 445 (step 525) by popping the BRA divergence token (step 555) and updating the active mask to 0xc and setting the active program counter to 0x2 (steps 570, 575, and 580). Controller 415 then fetches the MUL instruction (if-side of the conditional branch). Since the MUL instruction is not a control instruction and does not include a pop-sync flag, processing engines 302 execute this instruction (step 522) and the active program counter is incremented (step 527) to 0x3.

Controller 415 then fetches the next MUL instruction (second instruction for the if-side of the conditional branch). Since this MUL instruction is also not a control instruction and does not include a pop-sync flag, processing engines 302 execute this instruction (step 522) and the active program counter is incremented (step 527) to 0x4.

Controller 415 then fetches the (non-conditional) BRA instruction that specifies a target program counter of LABEL1 (PC=7). Since all of the active threads take the branch, the active program counter is set to the target program counter of 0x7 (steps 535, 542, and 545).

Controller 415 then fetches the MUL.S instruction which includes a pop-sync flag (.S) and unwinds the execution stack (step 525) by popping the SSY sync token (step 555) and updating the active mask to 0xfc and setting the active program counter to 0x8 (steps 570, 575, and 580). Controller 415 then fetches the MUL.S instruction and since the .S portion was executed and the threads are synchronized, processing engines 302 execute this instruction (step 522) and the active program counter is incremented (step 527) to 0x8. Controller 415 then fetches the RET instruction and unwinds the execution stack (steps 532 and 525) by popping the call token (step 555). Controller 415 updates the disable mask by clearing the disable state for any threads that were disabled waiting for a call token (step 565). Controller 415 then updates the active mask to 0xff and sets the active program counter to 0x51 (steps 570, 575, and 580). Controller 415 then fetches the ADD instruction and outputs the ADD instruction to processing engines 302 for execution.

One advantage of the disclosed system and method is that they allow threads in a multithreaded architecture to be broken into several SIMD thread groups. Within each SIMD thread group threads may diverge from each other and be disabled as needed to execute conditional branches, breaks, and returns. Furthermore, the threads in each SIMD thread group may be synchronized as needed for processing efficiencies. The result is a system that operates in full SIMD mode when possible and suffers only minimal performance degradation when thread divergences occur within a particular thread group as a branch is executed and the threads execute in a MIMD manner.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for managing divergent threads in a SIMD (single-instruction multiple-data) architecture when processing control instructions, the method comprising:
   receiving a first control instruction that includes a target address of another instruction in a program;
   determining that the first control instruction is a set-synchronization instruction, a prebreak instruction, or a prereturn instruction;
   pushing a token onto an execution stack, the token including a token type, the target address, and an active mask indicating active threads in a SIMD thread group that should be processed in parallel when the token is popped from the execution stack and execution of the program continues at the target address;
   updating an active program counter to specify an instruction in the program that is immediately after the first control instruction;
   receiving a second control instruction in the program; and
   determining that none of the threads in the SIMD thread group diverge in response to a condition test specified by the second control instruction.

2. The method of claim 1, further comprising:
   determining that the second control instruction is a break or return instruction;
   popping the token from the execution stack;
   setting the active mask to the mask from the token;
   setting the active program counter to the target address from the token; and
   executing one or more instructions starting at the target address.

3. The method of claim 1, wherein the first control instruction is a prereturn instruction, the token is a prereturn token, and the second control instruction is a return instruction.

4. The method of claim 1, wherein the first control instruction is a prebreak instruction, the token is a prebreak token, and the second control instruction is a break instruction.

5. The method of claim 2, further comprising modifying the active mask to disable processing of any of the threads in the SIMD thread group that are waiting for one or more threads in the SIMD thread group to complete execution of a conditional break or return branch.

6. The method of claim 1, further comprising executing the instruction specified by the active program counter for threads in the SIMD thread group that should be processed in parallel in the SIMD architecture.

7. A method for managing divergent threads in a SIMD (single-instruction multiple-data) architecture when processing control instructions, the method comprising:
   receiving a first control instruction that includes a target address of another instruction in a program;
   determining that the first control instruction is a set-synchronization instruction, a prebreak instruction, or a prereturn instruction;
   pushing a token onto an execution stack, the token including a token type, the target address, and an active mask indicating active threads in a SIMD thread group that should be processed in parallel when the token is popped from the execution stack and execution of the program continues at the target address; and
   updating an active program counter to specify an instruction in the program that is immediately after the first control instruction;
   receiving a second instruction in the program;
   determining that the second instruction is not a control instruction;
   determining that the second instruction specifies a synchronization point in the program;
   popping the token from the execution stack;
   setting the active mask to the mask from the token;
   setting the active program counter to the target address from the token; and
   executing one or more instructions starting at the target address.

8. The method of claim 7, wherein the first control instruction is a set synchronization instruction and the token is a sync token.

9. The method of claim 7, further comprising modifying the active mask to disable processing of any of the threads in the SIMD thread group that are waiting for one or more threads in the SIMD thread group to complete execution of a conditional break or return branch.

10. A computer readable medium storing instructions for causing a SIMD (single-instruction multiple-data) architecture processor to process control instructions by performing the steps of:
   receiving a first control instruction that includes a target address of another instruction in a program;
   determining that the first control instruction is a set-synchronization or prebreak or prereturn instruction;
   pushing a token onto an execution stack, the token including a token type, the target address, and an active mask indicating the active threads in a SIMD thread group that should be processed in parallel when the token is popped from the execution stack and execution of the program continues at the target address;

updating an active program counter to specify an instruction in the program that is immediately after the first control instruction;
receiving a second control instruction in the program; and
determining that none of the threads in the SIMD thread group diverge in response to a condition test specified by the second control instruction.

11. The computer readable medium of claim 10, further comprising:
determining that the second control instruction is a break or return instruction;
popping the token from the execution stack;
setting the active mask to the mask from the token;
setting the active program counter to the target address from the token; and
executing one or more instructions starting at the target address.

12. The computer readable medium of claim 1, wherein the first control instruction is a prereturn instruction, the token is a prereturn token, and the second control instruction is a return instruction.

13. The computer readable medium of claim 1, wherein the first control instruction is a prebreak instruction, the token is a prebreak token, and the second control instruction is a break instruction.

14. The computer readable medium of claim 11, further comprising modifying the active mask to disable processing of any of the threads in the SIMD thread group that are waiting for one or more threads in the SIMD thread group to complete execution of a conditional break or return branch.

15. A computer readable medium storing instructions for causing a SIMD (single-instruction multiple-data) architecture processor to process control instructions by performing the steps of:
receiving a first control instruction that includes a target address of another instruction in a program;
determining that the first control instruction is a set-synchronization or prebreak or prereturn instruction;
pushing a token onto an execution stack, the token including a token type, the target address, and an active mask indicating the active threads in a SIMD thread group that should be processed in parallel when the token is popped from the execution stack and execution of the program continues at the target address;
updating an active program counter to specify an instruction in the program that is immediately after the first control instruction
receiving a second instruction in the program;
determining that the second instruction is not a control instruction;
determining that the second instruction specifies a synchronization point in the program;
popping the token from the execution stack;
setting the active mask to the mask from the token;
setting the active program counter to the target address from the token; and
executing one or more instructions starting at the target address.

16. A system for processing control instructions in a SIMD (single-instruction multiple-data) architecture, the system comprising:
an execution stack configured to store thread state information for a number of threads that are concurrently executed by the SIMD architecture;
a controller that is coupled to the execution stack and configured to receive program instructions including control instructions and non-control instructions and to execute the control instructions by pushing and popping the thread state information and maintain an active mask that indicates threads in a SIMD thread group that should be processed in parallel, wherein the controller determines if any of the threads in the SIMD thread group diverge in response to a condition test specified by a control instruction;
a dispatcher coupled to the controller and configured to receive the non-control instructions and the active mask and schedule the non-control instructions for execution; and
multiple processing engines that are coupled to the dispatcher and configured to receive the program instructions and execute each program instruction in parallel for the threads in the SIMD thread group that should be processed in parallel according to the active mask.

17. The system of claim 16, wherein the controller is further configured to include a token type, a target address, and a mask in the thread state information that is pushed onto the execution stack, the mask indicating any threads in the SIMD thread group that should be processed in parallel when the thread state information is popped from the execution stack.

18. The system of claim 17, wherein the controller is further configured to push a token including the thread state information to execute a prebreak, prereturn or set-synchronization instruction.

19. The system of claim 17, wherein the controller is further configured to unwind the execution stack by popping thread state information and processing an instruction specified by the target address and using the mask from the state information as the active mask.

20. The system of claim 16, wherein the controller is further configured to disable processing of any thread in the SIMD thread group based on a disable state that indicates whether the particular thread is enabled, disabled as a result of executing a conditional return instruction, disabled as a result of executing a conditional break instruction, or has exited a program.

* * * * *

UNITED STATES PATENT AND TRADEMARK OFFICE
CERTIFICATE OF CORRECTION

| | | |
|---|---|---|
| PATENT NO. | : 7,877,585 B1 | Page 1 of 1 |
| APPLICATION NO. | : 11/845429 | |
| DATED | : January 25, 2011 | |
| INVENTOR(S) | : Coon et al. | |

It is certified that error appears in the above-identified patent and that said Letters Patent is hereby corrected as shown below:

Column 24, line 30, Claim 7, please remove "and".
Column 25, line 18, Claim 12, please replace "claim 1," with --claim 10,--.
Column 25, line 22, Claim 13, please replace "claim 1," with --claim 10,--.

Signed and Sealed this
Thirteenth Day of September, 2011

David J. Kappos
*Director of the United States Patent and Trademark Office*